June 15, 1943.   H. W. ZIMMERMAN   2,322,086
DRAW BAR
Filed Oct. 30, 1942   2 Sheets-Sheet 1
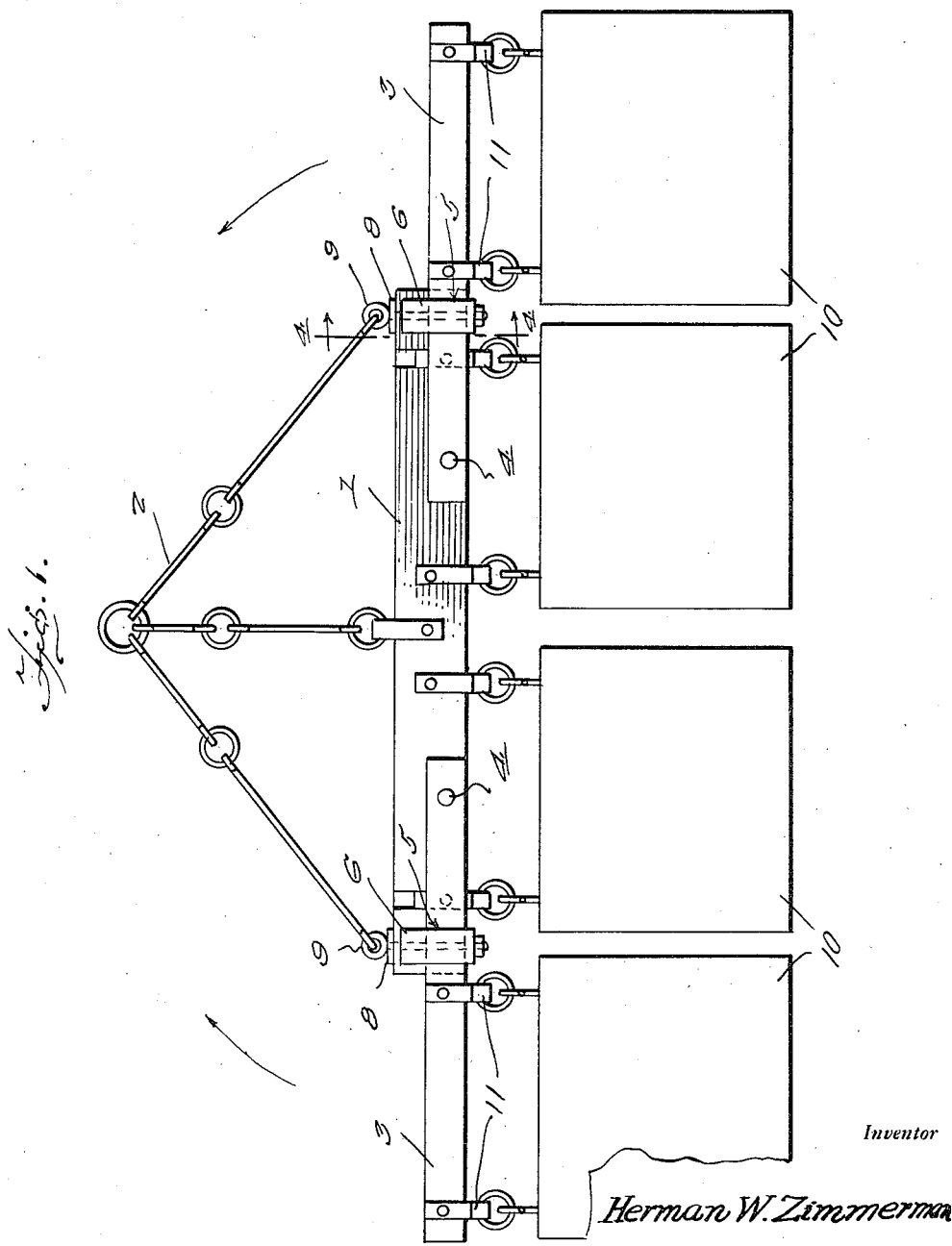
Inventor
Herman W. Zimmerman
By Clarence A. O'Brien
and Harvey B. Jacobson
Attorneys June 15, 1943. H. W. ZIMMERMAN 2,322,086
DRAW BAR
Filed Oct. 30, 1942 2 Sheets-Sheet 2
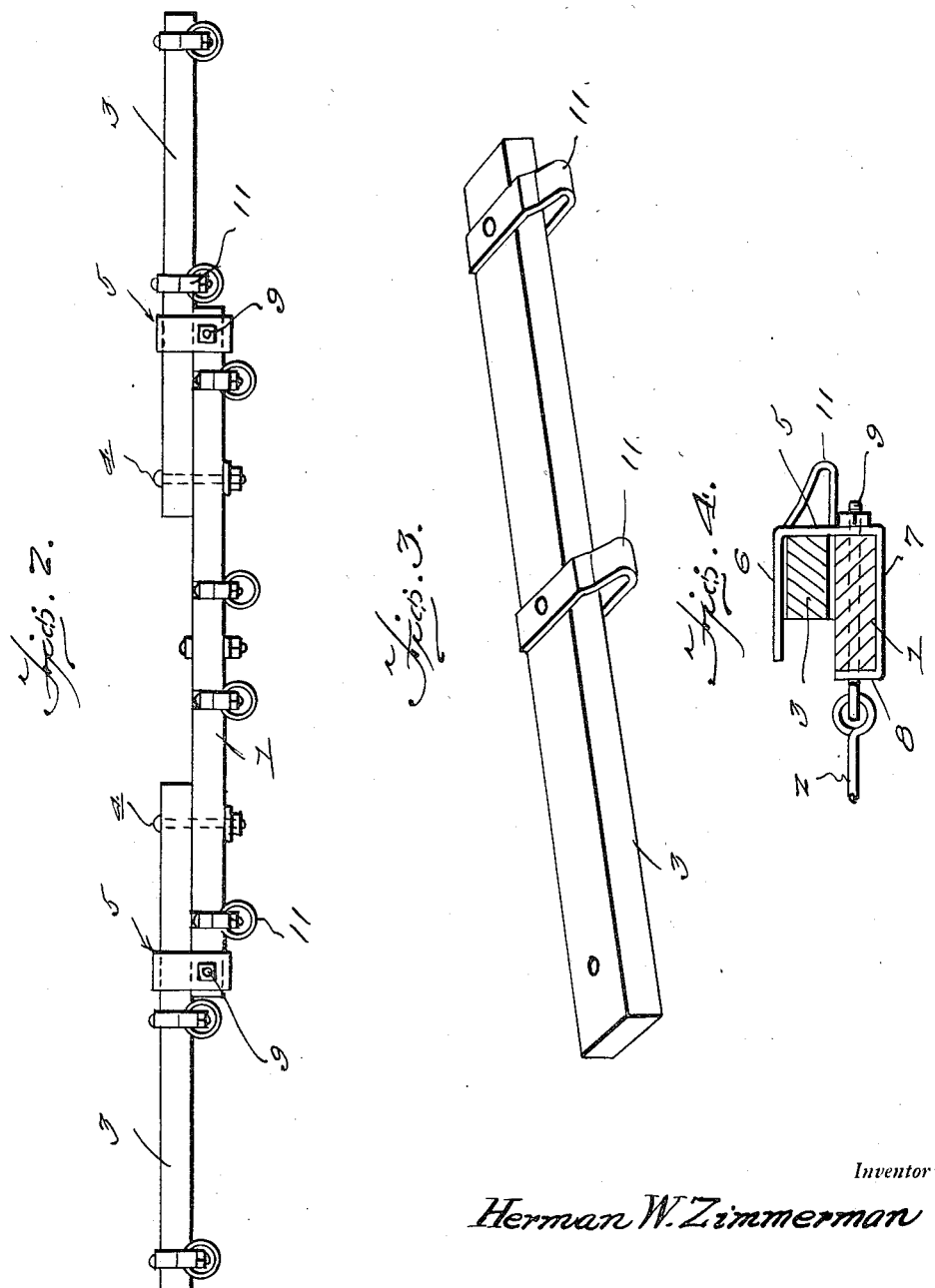
Inventor
Herman W. Zimmerman
By Clarence A. O'Brien
and Harvey B. Jacobson
Attorneys Patented June 15, 1943

2,322,086

UNITED STATES PATENT OFFICE 2,322,086

DRAWBAR

Herman W. Zimmerman, Rock Valley, Iowa

Application October 30, 1942, Serial No. 463,984

2 Claims. (Cl. 55—84)

The present invention relates generally to new and useful improvements in draw bars of the type comprising main and auxiliary trees having connected thereto a gang or series of drags.

The primary object of the invention is to provide a draw bar of the aforementioned character comprising a novel construction and arrangement whereby the auxiliary trees or extensions may be expeditiously folded forwardly in a horizontal plane for permitting the device to pass readily through a gate or other restricted opening.

Other objects of the invention are to provide a folding draw bar of the aforementioned character which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a draw bar constructed in accordance with the present invention, showing a plurality of drags connected to the device.

Figure 2 is a view in rear elevation of the draw bar.

Figure 3 is a perspective view of one of the auxiliary trees.

Figure 4 is a cross sectional view, taken substantially on the line 4—4 of Figure 1.

Referring now to the drawings in detail, it will be seen that the embodiment of the invention which has been illustrated comprises a main tree 1 of suitable material and dimensions. A suitable hitch 2 is connected to the main tree 1.

Auxiliary trees 3 have one end portion pivotally secured, as at 4, on the main tree 1 for swinging movement in a horizontal plane. It will be observed that the vertical pivots 4 are spaced from the ends of the main tree 1.

Mounted on the end portions of the main tree 1 are substantially U-shaped members 5 for the reception of the auxiliary trees 3. As illustrated to advantage in Figure 4 of the drawings, the open ends of the substantially U-shaped members 5 are disposed forwardly. The upper legs 6 of the members 5 are spaced transversely above the main tree 1 to accommodate the auxiliary trees 3 therebetween. The lower legs 7 of the members 5 terminate in upturned free end portions 8 which are engaged with the front of the main tree 1. Eye bolts 9 positively secure the members 5 in position on the main tree 1, said eye bolts passing through the portions 8 of said members, through said main tree and through the bight portions of said members.

It is thought that the manner in which the invention functions will be readily apparent from a consideration of the foregoing. Briefly, the substantially U-shaped members 5 constitute stops for firmly and positively retaining the auxiliary trees 3 in longitudinal alignment with the main tree 1 when under load. A plurality of drags 10 are loosely connected at 11 to the main and auxiliary trees 1 and 3, respectively. When a gateway is to be negotiated, the drags 10 are disconnected from the auxiliary trees 3 and said auxiliary trees are then folded forwardly in a horizontal plane on their pivots 4, as suggested by the arrows in Figure 1 of the drawings. Of course, when this is done, the auxiliary trees 3 are disengaged from the members 5. After the gateway or other narrow passage has been negotiated, the auxiliary trees 3 are expeditiously swung back into the members 5 and the drags may again be connected to said auxiliary trees. The eye bolts 9, in addition to securing the members 5, also constitute means for connecting the outer links of the hitch 2 to the main tree 1.

It is believed that the many advantages of a folding draw bar constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A folding drawbar comprising a main tree, auxiliary trees having one end portion pivotally secured to the main tree at points spaced inwardly from the ends thereof and adapted for swinging movement in a horizontal plane, and substantially U-shaped members mounted on the end portions of the main tree and having their open ends forwardmost for the reception of the auxiliary trees, said members constituting stops for retaining the auxiliary trees in operative position in parallelism with the main tree.

2. A folding draw bar of the character described comprising a main tree, substantially U-shaped horizontal members mounted transversely on the end portions of said main tree, said members including upper legs spaced above the main tree and further including lower legs comprising upturned free end portions engaged with the front of the main tree, eye bolts passing through the bight portions and the upturned end portions of the members for securing said members to the main tree, a hitch connected to said eye bolts, auxiliary trees having one end portion pivotally secured on the main tree at points in spaced relation to the ends thereof for swinging movement in a horizontal plane, said auxiliary trees being engageable in the members between said upper legs thereof and the main tree when in operative position, and means for connecting a plurality of drags to the main and auxiliary trees.

HERMAN W. ZIMMERMAN.